(12) United States Patent
Hofer

(10) Patent No.: US 11,038,225 B2
(45) Date of Patent: Jun. 15, 2021

(54) BATTERY INCLUDING TEMPERATURE CONTROL SYSTEM

(71) Applicant: Lisa Draexlmaier GmbH, Vilsbiburg (DE)

(72) Inventor: Guido Hofer, Weng (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 84 days.

(21) Appl. No.: 16/514,606

(22) Filed: Jul. 17, 2019

(65) Prior Publication Data
US 2020/0028224 A1  Jan. 23, 2020

(30) Foreign Application Priority Data
Jul. 20, 2018  (DE) .................... 10 2018 117 601.5

(51) Int. Cl.
*H01M 10/613* (2014.01)
*H01M 10/6568* (2014.01)
*H01M 10/617* (2014.01)
*H01M 10/625* (2014.01)
*H01M 10/643* (2014.01)
*H01M 10/63* (2014.01)
*H01M 50/20* (2021.01)
*H01M 50/502* (2021.01)

(52) U.S. Cl.
CPC ..... *H01M 10/6568* (2015.04); *H01M 10/613* (2015.04); *H01M 10/617* (2015.04); *H01M 10/625* (2015.04); *H01M 10/63* (2015.04); *H01M 10/643* (2015.04); *H01M 50/20* (2021.01); *H01M 50/502* (2021.01); *H01M 2220/20* (2013.01)

(58) Field of Classification Search
CPC ........... H01M 10/6568; H01M 10/613; H01M 10/625; H01M 10/63; H01M 10/643; H01M 10/617
See application file for complete search history.

(56) References Cited

U.S. PATENT DOCUMENTS

2008/0220315 A1* 9/2008 Dougherty ........ H01M 10/6566
429/53
2017/0309872 A1* 10/2017 Kuboki .................. H01M 2/20

FOREIGN PATENT DOCUMENTS

| DE | 102015013377 | 4/2017 |
| WO | 2017004078 | 1/2017 |

* cited by examiner

Primary Examiner — Olatunji A Godo
(74) Attorney, Agent, or Firm — Burris Law, PLLC

(57) ABSTRACT

A battery is provided that includes a battery module, which includes cylindrical battery cells connected to each other in an electrically conductive manner. A temperature control system includes a container including a fluid space, into which container the battery cells partially protrude, and which includes an inflow and an outflow for a liquid of a liquid circuit. The liquid is an electrically non-conductive liquid, and the container includes a cell holder including openings, through which respective end sides of the battery cells of the battery module protrude into the fluid space of the container and which enclose respective outer surfaces of the battery cells in a liquid-tight manner. The cell holder includes a further opening, through which a contact element protrudes into the fluid space of the container and which surrounds an outer surface of the contact element in a liquid-tight manner.

12 Claims, 4 Drawing Sheets

BATTERY INCLUDING TEMPERATURE CONTROL SYSTEM

CROSS-REFERENCE TO RELATED APPLICATIONS

This application claims priority to and the benefit of German Application No. 10 2018 117 601.5, filed on Jul. 20, 2018. The disclosure of the above application is incorporated herein by reference.

FIELD

The present disclosure relates to batteries and methods of cooling batteries, for example, in automotive applications.

BACKGROUND

The statements in this section merely provide background information related to the present disclosure and may not constitute prior art.

It is known per se that batteries, in particular battery cells connected together into batteries, must often be cooled. In particular, in applications in the automotive environment it is important and necessary that employed battery cells can be cooled sufficiently in order firstly to ensure the performance of the battery cells, and secondly to avoid an overheating up to the thermal instability point of the battery cells, for example, lithium-ion cells.

DE 10 2015 013 377 A1 describes a temperature control system for a battery system that includes a plurality of cylindrical battery cells. The temperature control system comprises a cuboid hollow body that can be traversed by a cooling fluid and that encloses respective cell outer surfaces of the battery cells in a liquid-tight manner. Respective cell heads and cell bases of the battery cells are not disposed in the hollow body. A cooling of the battery cells thus occurs via the outer surfaces of the battery cells, which outer surfaces are disposed in the hollow body.

SUMMARY

The present disclosure provides battery cells of a battery that can be cooled in a particularly effective manner.

The present disclosure comprises at least one battery module that includes a plurality of cylindrical battery cells connected to one another conductively. In addition, the battery comprises a temperature control system for temperature control of the battery cells, including a container including a fluid space, into which container the battery cells partially protrude, and which includes an inflow and outflow for a liquid of a liquid circuit. The present disclosure is characterized in that the liquid is an electrically non-conductive liquid. The container comprises a cell holder including a plurality of openings, through which respective end sides of the battery cells of the at least one battery module protrude into the fluid space of the container, and which enclose respective outer surfaces of the battery cells in a liquid-tight manner, wherein the cell holder further includes at least one further opening through which a contact element protrudes into the fluid space of the container, and which encloses an outer surface of the contact element in a liquid-tight manner. In addition, the battery comprises a connecting device disposed in the fluid space of the container, which connecting device electrically conductively connects respective poles of the end sides of the battery cells, which end sides protrude into the fluid space of the container, to the contact element protruding into the container.

Cylindrical battery cells, i.e. so-called round cells, are the battery cells having the greatest distribution and are readily available. Such round cells are used inter alia for so-called booster batteries for hybrid vehicles. Specifically, this application uses a high-performance cooling connection, which is not simple in particular in the case of round cells. The present disclosure is based on the recognition that round cells or cylindrical battery cells have anisotropic behavior with respect to their thermal conductivity. In the case of the round cells, this means that the thermal conductivity is significantly higher in the axial direction than in the radial direction. The thermal conductivity in the axial direction can be, for example, greater by a factor of 30 than in the radial direction.

This effect is usually derived from the fact that in round cells a cell winding usually plugs into a metal cup, wherein the cell winding is comprised of various layers of metal films that are separated by a separator in the form of a plastic film. During a heating occurring in the radial direction the heat occurring in the cell interior must penetrate each film layer, which is impeded by the transitions from layer to layer and by the insulating separator. In contrast, the heat transport in the axial direction inside the metallic films is substantially easier. The heat occurring in the cell interior can thus be discharged very well to the end sides of such cylindrical battery cells, whereas a heat discharge in the radial direction is significantly less effective.

The present disclosure makes use of this recognition by having the end sides of the batteries protruding into the fluid space of the container in the one form of the battery, in which fluid space the liquid can be located, which liquid can be supplied and discharged via the liquid circuit mentioned. Since in the present disclosure an electrically non-conductive liquid or an electrically insulating liquid is used as the liquid, it is possible for the poles of the end sides of the battery cells to contact each other by the contacting device also disposed in the fluid space of the container and serving as current collector, and the end sides of the battery cells protrude into the fluid space of the container. Using the connecting device disposed in the fluid space of the container, the battery cells are also electrically conductively connected to the contact element protruding into the container.

Thus, in the present disclosure it is not necessary, for example, to supply a separate cooling plate for current-collecting metal plates located on the cathode-side, for instance, and separately insulate these cooling plates electrically in order to inhibit a short circuit. For heat dissipation, this electrical insulation would form a barrier layer that would impede heat removal. In such solutions, gap-filler masses are also used to compensate for unevennesses and for bridging air gaps. However, gap-filler masses are firstly expensive, and secondly have only very moderate thermal conductivity themselves. In contrast, in the present disclosure, the end sides of the battery cells are immersed directly into the liquid that is located in the container of the temperature control system. Excess heat from the battery cells can thus be discharged directly to the liquid in the container of the temperature control system and discharged via the liquid circuit. In addition, the battery cells must respectively be sealed in a liquid-tight manner by the cell holder only at one point on the outer side. This is affected firstly in that the openings of the cell holder provided for the battery cells hold the battery cells and secondly in that the battery cells are enclosed in a liquid-tight manner.

According to the present disclosure, the liquid of the temperature control system is thus directly supplied to the respective battery cells, and specifically also to the end sides of the battery cells. There are thus no insulating air gaps and also no insulating films or other insulating materials that could impede heat transport. A separate condenser is also not necessary in the battery according to the present disclosure. The liquid serving in particular as a cooling medium, inside the container of the temperature control system can thus wash around the battery cells at their end sides as well as the connecting device, serving as current collector, which is also disposed in the liquid space of the container, and thus improving the discharge of heat emanating from the battery cells.

Since the connecting device serving as current collector is also disposed in the fluid space of the container, the connecting device can also be cooled very well. The cooler the connecting device serving as current collector is, the lower is the electrical resistance of the connecting device. Consequently, the material thickness of the connecting device can be chosen to be relatively small. In the battery according to the present disclosure it is also possible, depending on the cooling requirement, to immerse the battery cells by their end sides deeper through the openings of the cell holder into the container and thus into the liquid serving as cooling fluid. In this way, even more surface area is available on the battery cells, which surface is in direct contact with the liquid serving for cooling. Overall, using the battery according to the present disclosure provides a particularly effective possibility for temperature control of battery cells. In principle, the liquid can also be used to heat the battery cells. If the battery cells, for example, have a very low temperature, then the liquid can also be used to introduce heat into the battery cells via the battery cells immersed in the liquid. Both during discharging and during charging, battery cells have a certain temperature range wherein the power output and power consumption can be affected particularly well. The temperature control system can thus also be used to bring the battery cells to a desired operating temperature as quickly as possible.

An advantageous form of the present disclosure provides that the liquid is a transformer oil. Transformer oil or so-called insulating oil is a highly-refined mineral oil or a low-viscosity silicone oil that is stable at high temperatures. It is used, for example, in high-voltage technology in transformers, capacitors, and switches for insulation, for spark suppression, for lubrication, and for cooling, for example, in power electronics. Due to the transformer oil, a particularly good electrical insulation can be provided inside the container filled with the liquid, and a good heat discharge from the battery cells can be made possible. Other non-conductive or insulating liquids can also be used for temperature control of the battery cells.

A further advantageous form of the present disclosure provides that the cell holder comprises a first plastic component, and a second plastic component that is softer than the first plastic component and that surrounds the openings to seal the outer surfaces of the battery cells and of the contact element. The cell holder can be manufactured, for example, by a two-component injection-molding method. The openings for receiving the battery cells and the contact elements are overmolded with the second plastic component serving as soft component or seal. The second plastic component thus acts as an elastic seal that acts radially on the battery cells and the contact element. A particularly reliable sealing effect can thereby be realized on the outer surfaces of the battery cells and on the at least one contact element.

A further advantageous form of the present disclosure provides that the connecting device comprises at least one metal plate that is connected to the poles of the battery cells that are protruding into the fluid space of the container. The poles of the battery cells can thereby be electrically conductively connected to each other in a simple manner by the metal plate serving as current collector.

A further advantageous design of the present disclosure provides that the metal plate includes respective projections that are directly connected to the poles of the battery cells. The connection can be produced, for example, by welding, e.g., by resistance projection welding or also by other welding methods such as laser welding or resistance gap welding. In this case, the projections are high enough that during welding they do not completely melt away, wherein the metal plate would rest flat against the end side or the poles of the battery cells. Due to the higher-than-normal shaped projections, the spacing is retained firstly, and secondly the metal plate is thinned out at the projection tip, whereby a relatively thick metal plate (for reasons of current-carrying capacity) can nonetheless still be welded to the usually very thin end sides of the battery cells. The projections on the metal plate are thus also raised towards the poles of the battery cell after the connecting process. The liquid in the container of the temperature control system can thus easily wash around the end sides of the battery cells and simultaneously a reliable electrical and mechanical connection is obtained between the poles of the end sides of the battery cells and the metal plate. The metal plate can be, for example, an electro nickel-plated diffusion annealed metal strip such as the Hilumin® brand. Particularly during projection welding, the metal plate is usually comprised of the same material as the poles of the battery cells. This entails the advantage that the metal plate can be welded to the poles of the battery cells in a particularly simple manner. In addition, a contact corrosion can thereby also be inhibited.

An alternative advantageous form of the present disclosure provides that the connecting device comprises wires, using which the metal plate is connected to the poles of the battery cells, which poles project into the fluid space of the container. It is also possible in this way to achieve a simple and reliable contacting of the poles of the battery cells with the metal plate. In this case, it is also possible that the metal plate is manufactured from a different material than the poles of the battery cells. The metal plate can be, for example, an aluminum metal plate. Since the connection between the metal plate and the poles of the battery cells is affected by mediation of the wires, for example, by bonding wires, materials can also be connected that usually cannot be welded so easily. In one form, wire bonding is an ultrasonic welding method.

A further advantageous form of the present disclosure provides that the battery cells of the at least one battery module are disposed in a plurality of rows, wherein each row of one of the contact elements protrudes through corresponding openings of the cell holder into the fluid space of the container and is electrically conductively connected via the connecting device to the poles of the battery cells of the respective row. In this way, the cells are connected in series. The individual rows themselves can then in turn be connected to each other or electrically conductively connected, for example, in series.

A further advantageous design of the present disclosure provides that the end sides of the battery cells that protrude into the fluid space of the container are respective cell bases of the battery cells. In other words, the respective cathode sides of the battery cells are thus immersed into the fluid space of the container. Degassing valves are often provided on the cell heads of such battery cells, i.e., the anode side. Since the battery cells are immersed into the fluid space of the container by their cell bases, i.e., by their cathode side, such degassing valves play no role on the anode side, i.e., on the cell heads. In principle, however, it is also possible that the end sides of the battery cells, which end sides protrude into the fluid space of the container, are each cell heads, i.e., anode sides, of the battery cells. In the case of degradation, a suitable pressure reduction is then achieved for the cell degassing.

A further advantageous form of the present disclosure provides that the container includes a cover connected in a liquid-tight manner to the cell holder. In other words, the rear of the cell holder is closed by the cover in a liquid-tight manner. As soon as the battery cells and the at least one contact element protrude through the mentioned opening of the cell holder into the fluid space of the container, and the cover closes the rear side of the cell holder, the entire container is closed in a liquid-tight manner, so that the liquid received in the container cannot escape.

Further, an alternative advantageous form of the present disclosure provides that the battery includes two of the battery modules, between which the container composed of two of the cell holders is disposed, in which container the respective end sides of the battery cells protrude from two opposing sides. In pairs, the mentioned battery modules can thus divide the container of the temperature control system, which in this case is composed of two of the cell holders. Thus, for example, the battery cells of the one battery module can enter from above and the battery cells of the other battery module from below into the respective cell holder through the mentioned openings into the interior of the container. The two cell holders can be connected to each other, for example, in an interference-fit and liquid-tight manner via a type of tongue-and-groove principle. Since the two battery modules divide a common fluid space of the container assembled from the two cell holders, the temperature control system can be used particularly efficiently with few components for cooling the battery cells of both battery modules.

As already explained, such a battery can be used in a vehicle, for example, in a hybrid vehicle or electric vehicle, among other applications.

Further advantages, features, and details of the present disclosure are indicated in the following description of exemplary forms as well as with reference to the drawings. The features and feature combinations mentioned above in the description, as well as the features and feature combinations shown below in the description of figures and/or the figures alone can be used not only in the respective combination specified, but also in other combinations or independently without departing from the context of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Identical or functionally identical elements in the figures have been provided with the same reference numbers throughout.

Figure 1:
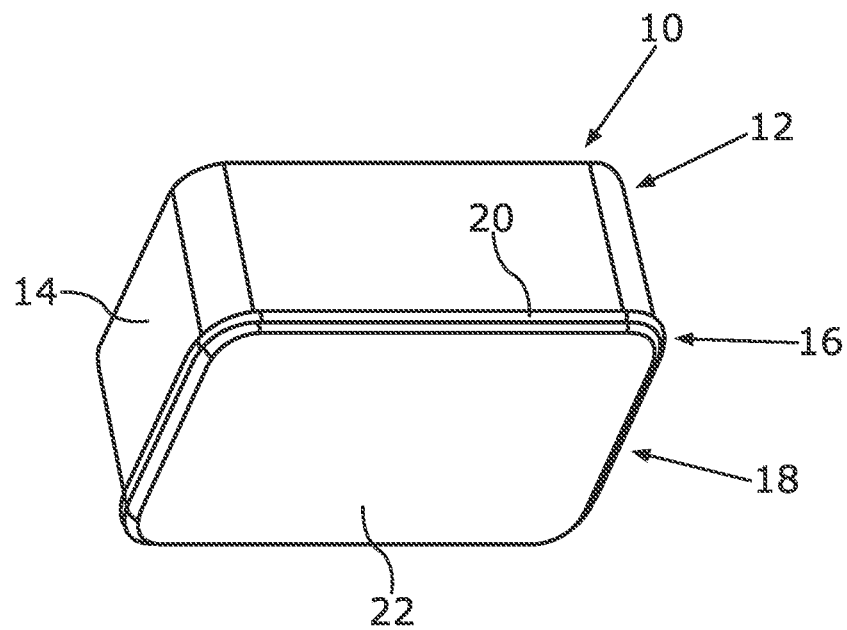
FIG. 1 shows a schematic perspective view of a battery that includes a battery module, on whose underside a temperature control system for temperature control of respective battery cells of the battery module is disposed, which temperature control system includes a container fillable with liquid for cooling the battery cells.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A first form of a battery 10 including a battery module 12 is shown in a perspective view in FIG. 1. The battery module 12 comprises a housing 14, wherein a plurality of cylindrical battery cells, which are not visible here, i.e., so-called round cells, are disposed. The battery 10 further comprises a temperature control system 16 for temperature control, in particular for cooling of the battery cells, which are not visible here.

The temperature control system 16 comprises a container 18 that encloses a fluid space (not visible here), into which the battery cells partially protrude. Here the container 18 comprises a cell holder 20 and a cover 22 that outwardly delimit the mentioned fluid space of the container 18. The container 18 further comprises not-depicted terminals for a fluid circuit so that a liquid for temperature control of the battery cells can be supplied to the container 18 and discharged therefrom.

Figure 2:
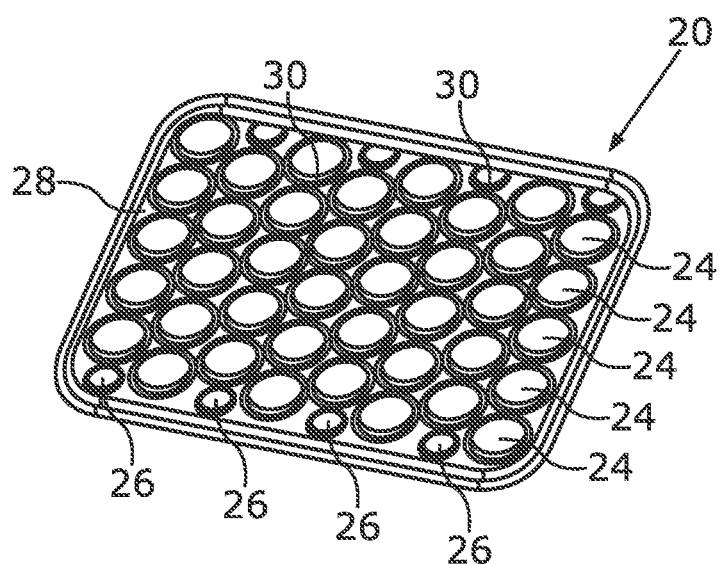
FIG. 2 shows a perspective view from below onto a cell holder that is a part of the container of the temperature control system.

In FIG. 2 the cell holder 20 is shown in a perspective view from below. As mentioned, together with the cover 22 depicted in FIG. 1, the cell holder 20 forms the container 18, wherein an electrically non-conductive liquid can be received for temperature control of the battery cells. The electrically non-conductive liquid can be, for example, transformer oil. The cell holder 20 comprises a plurality of openings 24 through which the battery cells can be inserted into the fluid space of the container 18. Furthermore, the cell holder 20 comprises further smaller openings 26, through which a plurality of cylindrical contact elements, which are not depicted here, can also be inserted into the fluid space of the container 18. The cell holder 20 is manufactured by two-component injection molding. The cell holder 20 comprises a first plastic component 28 and a second plastic component 30 that is softer than the first plastic component 28. The second plastic component 30 serves as an elastic seal and surrounds the respective openings 24, 26.

Figure 3:
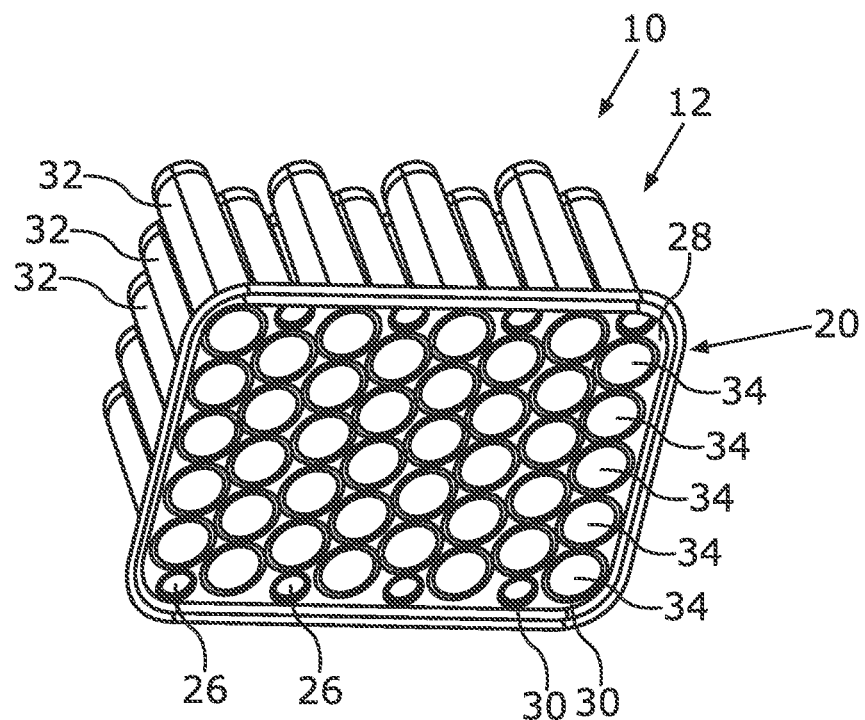
FIG. 3 shows a further perspective view from below onto the cell holder, wherein a plurality of battery cells have been inserted through respective openings of the cell holder.

In FIG. 3 the battery 10, which includes only one battery module 12, is partially shown in a perspective view obliquely from below. In the present case the housing 14 of the battery module 12 is not depicted, so that the view of the already-mentioned cylindrical battery cells 32 is clear. The battery cells 32 have been inserted previously by their respective cell bases 34 through the larger openings 24 of the cell holder 20, which larger openings 24 are not indicated in more detail, so that the cell bases 34 protrude into the fluid space of the container 18. Here the second plastic component 30, which serves as an elastic seal, encloses respective outer surfaces of the battery cells 32, which outer surfaces are not indicated in more detail, so that a liquid-impermeable sealing occurs at these points.

Figure 4:
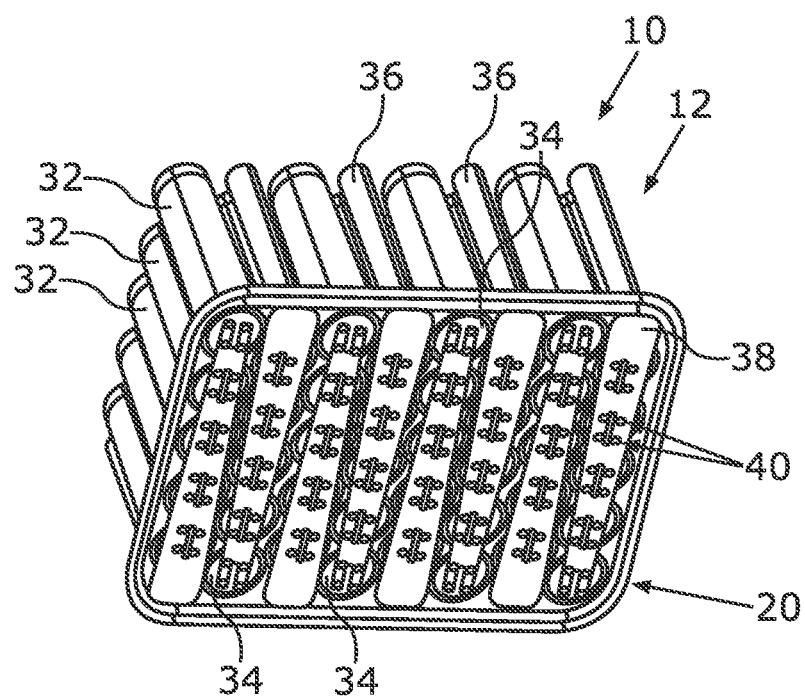
FIG. 4 shows an additional perspective view from below onto the cell holder, wherein a plurality of pin-shaped contact elements have been inserted through associated openings in the cell holder, and the battery cells are electrically conductively connected to each other by metal plates serving as current collector and are also connected to the contact elements.

In FIG. 4 the battery module 12 is in turn partially depicted in a perspective view obliquely from below. In addition to the battery cells 32, a plurality of cylindrical contact elements 36 have been pushed-in or inserted into the fluid space of the container 18 through the cell holder 20 by their end sides. Here the cylindrical contact elements 36 have been pushed through the smaller openings 26, wherein the second plastic component 30 serving as an elastic seal encloses the contact elements 36 in a liquid-tight manner on their outer surfaces. In the state shown in FIG. 4 all openings 24, 26 are thus occupied by the inserted battery cells 32 or pushed-in contact elements 36, so that liquid can no longer escape through the openings 24, 26 of the cell holder 20. The cover 22 (not depicted here) closes the cell holder 20 in a liquid-tight manner from below, so that liquid can no longer escape from the container 18 formed from the cell holder 20 and the cover 22 via the inflows and outflows (not depicted here) of the mentioned liquid circuit.

The cell bases 34, which protrude into the fluid space of the container 18, are connected to each other in series in a conductive manner via respective metal plates 38 serving as connecting device or current collector. The metal plates 38 have been directly connected by resistance projection welding to poles of the battery cells 32, which poles are visible and not indicated here in more detail. The metal plates 38 thus include a plurality of projections 40 for producing the weld connection to the poles of the battery cells 32. The metal plates 38 can be, for example, electro nickel-plated diffusion annealed metal strips, such as the Hilumin® brand metal strips. The metal plates 38 are in one form manufactured from the same material as the poles of the battery cells 32, which greatly facilitates the welding of the metal plates 38 to the poles of the battery cells 32. Due to the projection welding of the metal plates 38 to the projections 40, the liquid present in the container 18 can easily wash around the cell bases 34 of the battery cells 32, and a reliable electrical and mechanical connection is also obtained between the poles of the battery cells 32 and the metal plates 38. Alternatively, it is also possible to use aluminum plates for the metal plates 38, which can be contacted to the poles of the battery cells 32, for example, by bonding wires (not depicted here).

The battery cells 32 of the battery module 12 are disposed in a plurality of rows, wherein each row of one of the cylindrical contact elements 36 is electrically conductively connected to the battery cells 32 of the respective row by mediation of the metal plates 38. A different interconnection of the battery cells 32 to each other is of course also possible.

Figure 5:
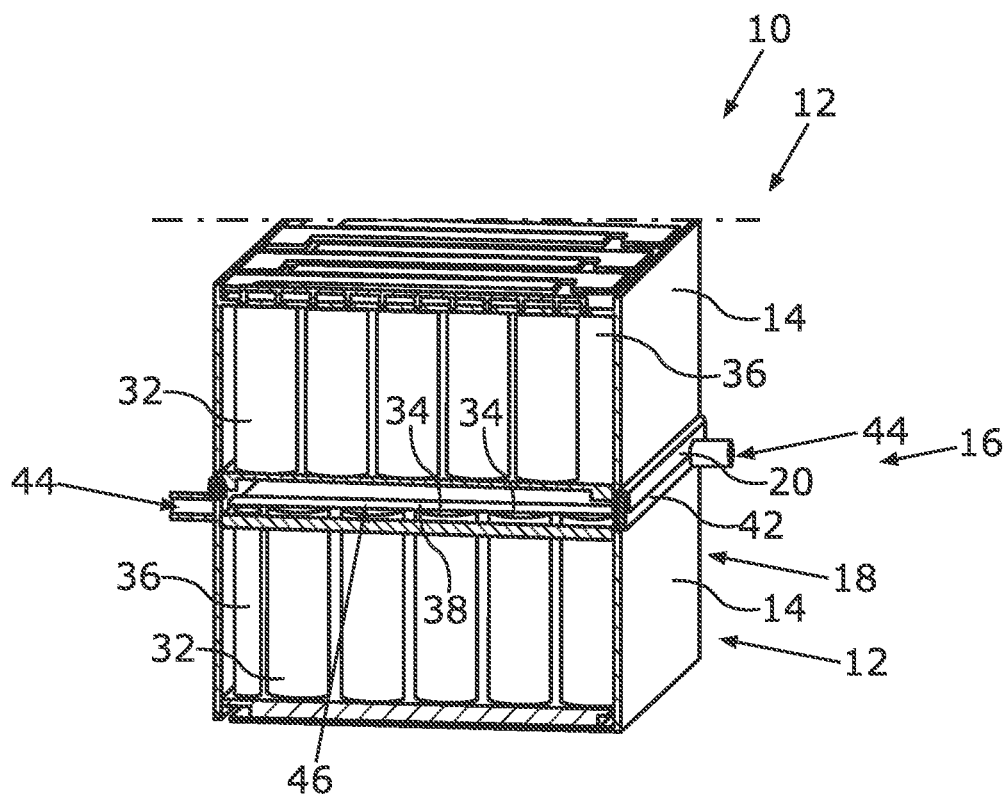
FIG. 5 shows a perspective view of a second form of the battery, wherein this includes two batteries disposed one above the other, between which the container of the temperature control system is disposed, which container is composed of two of the cell holders, into which container the respective cell bases of the battery cells protrude from two opposing sides.

In FIG. 5 a second form of the battery 10 is shown in a perspective view. Here the battery 10 comprises two of the battery modules 12, between which the container 18 of the temperature control system 16 is disposed. In the present case the container 18 comprises an additional cell holder 42 in addition to the cell holder 20, instead of the cover 22 (see FIG. 1). The additional cell holder 42 further comprises terminals 44, via which an electrically non-conductive liquid, for example, a transformer oil, can be supplied to the fluid space 46 of the container 18 and discharged therefrom. In this form the fluid space 46 is thus delimited by the two cell holders 20, 42, whereas in the first form the fluid space 46, which has not been indicated with a reference number in the preceding figures, was delimited by the cell holder 20 and the cover 22.

The battery cells 32 of the two battery modules 12 are in turn inserted into the cell holders 20, 42 such that they protrude via their respective cell bases 34 into the fluid space 46 of the container 18 of the temperature control system 16. The metal plates 38 serving as connecting device or current collectors are in turn used to electrically conductively connect the poles (not indicated in more detail here) of the cell bases 34 of the battery cells 32 to each other and to the cylindrical contact elements 36.

Figure 6:
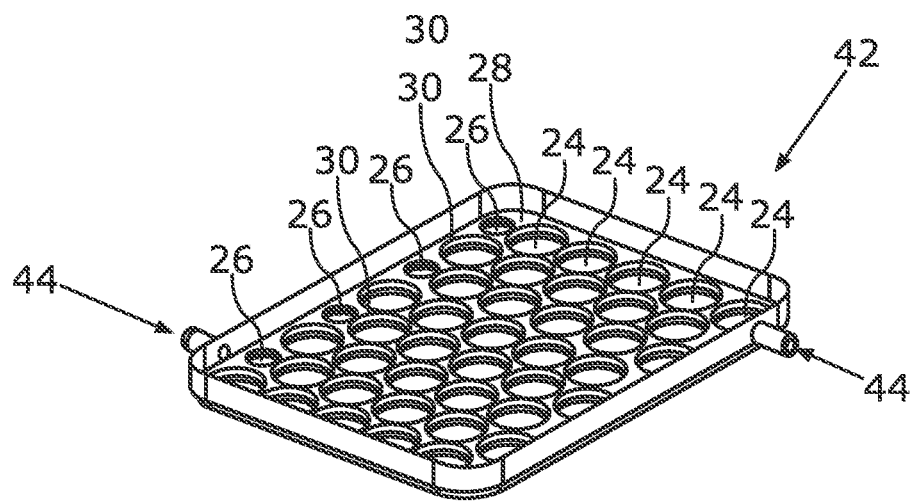
FIG. 6 shows a perspective view of the lower of the two cell holders shown in FIG. 5.

In FIG. 6 the cell holder 42 is shown in a perspective view. Apart from the terminals 44, the cell holder 42 has essentially the same design as the cell holder 20 (see, for example, FIG. 2). This cell holder 42 is also in one form manufactured by a two-component injection molding method, so that the cell holder 42 for its part includes the first plastic component 28, and the second plastic component 30 that is softer than the first plastic component 28. The softer plastic component 30 serves in turn as an elastic seal and surrounds the small and large openings 24, 26, so that the battery cells 32 and the cylindrical contact elements 36 are enclosed in a liquid-tight manner on the respective outer surfaces. As soon as the battery cells 32 and the contact elements 36 have been inserted through the openings 24, 26 of the two cell holders 20, 42, the fluid space 46, which is enclosed by the two cell holders 20, 42, is closed in a liquid-tight manner, of course apart from the terminals 44 for supplying and discharging the electrically non-conductive liquid, which serves for temperature control of the battery cells 32.

Figure 7:
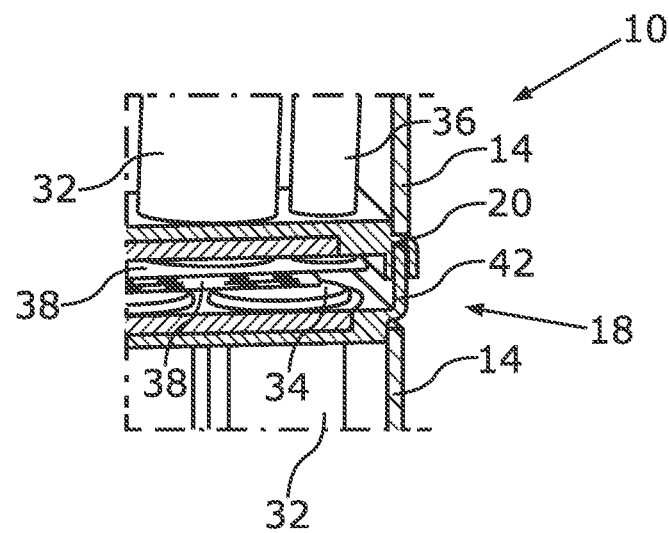
FIG. 7 shows a partial cut-away detailed view of the second form of the battery in the region of the cell holder.

In FIG. 7 the second form of the battery 10 is shown in a partial cut-away detail view in the region of the two cell holders 20, 42. The two cell holders 20, 42 engage into each other in an interference-fit by being connected to each other by a type of tongue-and-groove principle. The cell holders 20, 42 engaging into each other can be sealed, for example, using an adhesive.

Figure 8:
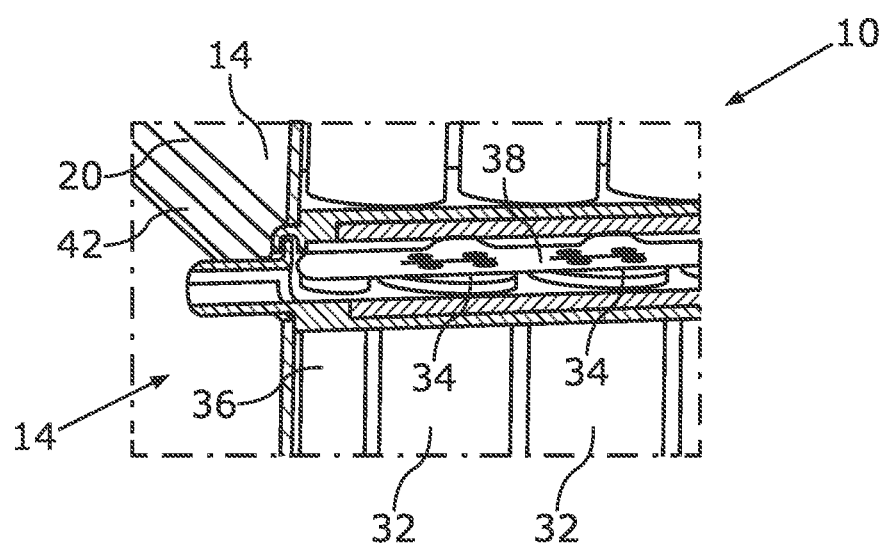
FIG. 8 shows a further partial cut-away detailed view of the second form of the battery in the region of the two cell holders.

In FIG. 8 the second form of the battery 10 is in turn shown in a partial cut-away detail view in a region around the two cell holders 20, 42. Here it is again evident that the two cell holders 20, 42 have been connected to each other by a tongue-and-groove principle in an interference-fit by their circumferential edges. Since in the second form the two battery modules 12 share the temperature control system 16 with the two cell holders 20, 42, a particularly good temperature control of the battery cells 32 of both battery modules 12 can be achieved with a relatively small installation space requirement and component requirement.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery, comprising:
    at least one battery module, which includes a plurality of cylindrical battery cells connected to each other in an electrically conductive manner; and
    a temperature control system for temperature control of the battery cells including a container including a fluid space, into which container the battery cells partially protrude, and which includes an inflow and an outflow for a liquid of a liquid circuit,
    wherein:
        the liquid is an electrically non-conductive liquid;
        the container includes a cell holder including a plurality of openings, through which respective end sides of the battery cells of the at least one battery module protrude into the fluid space of the container and which enclose respective outer surfaces of the battery cells in a liquid-tight manner, wherein the cell holder includes at least one further opening, through which a contact element projects into the fluid space of the container and which surrounds an outer surface of the contact element in a liquid-tight manner; and
        a connecting device disposed in the fluid space of the container connects respective poles of the end sides of the battery cells, which end sides protrude into the fluid space of the container, to the contact element projecting into the container.

2. The battery according to claim 1, wherein the liquid is a transformer oil.

3. The battery according to claim 1, wherein the cell holder comprises a first plastic component, and a second plastic component which is softer than the first plastic component and surrounds the openings for sealing the outer surfaces of the battery cells and of the contact element.

4. The battery according to claim 1, wherein the connecting device comprises at least one metal plate that is connected to the poles of the battery cells, which poles protrude into the fluid space of the container.

5. The battery according to claim 4, wherein the metal plate includes respective projections that are directly connected to the poles of the battery cells.

6. The battery according to claim 4, wherein the metal plate is made of the same material as the poles of the battery cells.

7. The battery according to claim 4, wherein the connecting device comprises wires by which the metal plate is connected to the poles of the battery cells, which poles protrude into the fluid space of the container.

8. The battery according to claim 7, wherein the metal plate is made of a different material than the poles of the battery cells.

9. The battery according to claim 1, wherein the battery cells of the at least one battery module are disposed in a plurality of rows and the contact element comprises at least one row of contact elements, wherein each of the contact elements protrudes through corresponding openings of the cell holder into the fluid space of the container and is electrically conductively connected by the connecting device to the poles of the battery cells in a given row of the plurality of rows.

10. The battery according to claim 1, wherein the end sides of the battery cells, which protrude into the fluid space of the container, are respective cell bases of the battery cells.

11. The battery according to claim 1, wherein the container includes a cover connected to the cell holder in a liquid-tight manner.

12. The battery according to claim 1, wherein the battery includes two of the battery modules, between which the container composed of two of the cell holders is disposed, into which container the respective end sides of the battery cells protrude from two opposing sides.

* * * * *